(12) United States Patent
Block et al.

(10) Patent No.: US 6,852,301 B2
(45) Date of Patent: Feb. 8, 2005

(54) METHOD FOR PRODUCING SILANE

(75) Inventors: Hans-Dieter Block, Leverkusen (DE); Leslaw Mleczko, Bochum (DE); Andreas Bulan, Langenfeld (DE); Rainer Weber, Odenthal (DE); Sigurd Buchholz, Köln (DE); Torsten Sill, Schwelm (DE)

(73) Assignee: Solarworld Aktiengesellschaft, Bonn (DE)

( * ) Notice: Subject to any disclaimer, the term of this patent is extended or adjusted under 35 U.S.C. 154(b) by 0 days.

(21) Appl. No.: 10/450,207

(22) PCT Filed: Nov. 21, 2001

(86) PCT No.: PCT/EP01/13506
§ 371 (c)(1),
(2), (4) Date: Oct. 27, 2003

(87) PCT Pub. No.: WO02/48035
PCT Pub. Date: Jun. 20, 2002

(65) Prior Publication Data
US 2004/0062702 A1 Apr. 1, 2004

(30) Foreign Application Priority Data
Dec. 11, 2000 (DE) .......................... 100 61 680

(51) Int. Cl.⁷ .............................................. C01B 33/04
(52) U.S. Cl. ..................................................... 423/347
(58) Field of Search ................................ 423/347, 324, 423/341, 342

(56) References Cited

U.S. PATENT DOCUMENTS

| 4,340,967 A | 7/1982 | Dixon et al. |
| 4,676,967 A | 6/1987 | Breneman |
| 4,690,810 A | 9/1987 | Breneman et al. |

FOREIGN PATENT DOCUMENTS

| DE | 25 07 864 | 8/1975 |
| DE | 37 09 577 A1 | 10/1987 |
| EP | 0 133 209 A2 | 2/1985 |

OTHER PUBLICATIONS

Øye et al., Jun. 3–5, 1998, *Silicon for the Chemical Industry IV*, Norwegian University of Science and Technology 7034 Trandheim, Norway.
Lewis et al., 1993, *Catalyzed Direct Reactions of Silicon*, Studies in Organic Chemistry 49.
Gerhartz et al., 1988, *Dust Separation*, Ullmann's Encyclopedia of Industrial Chemistry, 5$^{th}$ Completely Revised Edition, vol. B 2: Unit Operations I, p. 13–4 to 13–8.
Gerhartz et al., 1988, *Mixing of Solids*, Ullmann's Encyclopedia of Industrial Chemistry, 5$^{th}$ Completely Revised Edition, vol. B 2: Unit Operations I, p. 27–1 to 27–16.
Shimizu, 1985, *Economics of Polysilicon Process—A view from Japan*, Workshop DOE/JPL–1012–122, 1985, pp. 57–78.

Primary Examiner—Stanley S. Silverman
Assistant Examiner—Edward M. Johnson
(74) Attorney, Agent, or Firm—McGlew and Tuttle, P.C.

(57) ABSTRACT

The invention relates to a method for producing silane ($SiH_4$) by a) reacting metallurgical silicon with silicon tetrachloride ($SiCl_4$) and hydrogen ($H_2$), to form a crude gas stream containing trichlorosilane ($SiHCl_3$) and silicon tetrachloride ($SiCl_4$), b) removing impurities from the resulting crude gas stream by washing with condensed chlorosilanes, c) condensing and subsequently, separating the purified crude gas stream by distillation, d) returning the partial stream consisting essentially of $SiCl_4$ to the reaction of metallurgical silicon with $SiCl_4$ and $H_2$, e) disproportionating the partial stream containing $SiHCl_3$, to form $SiCl_4$ and $SiH_4$ and f) returning the $SiH_4$ formed by disproportionation to the reaction of metallurgical silicon with $SiCl_4$ and $H_2$, the crude gas stream containing trichlorosilane and silicon tetrachloride being liberated from solids as far as possible by gas filtration before being washed with the condensed chlorosilanes. The washing process with the condensed chlorosilanes is carried out at a pressure of 25 to 40 bar and at a temperature of at least 150° C. in a single-stage distillation column and is carried out in such a way that 0.1 to 3 wt. % of the crude gas stream containing trichlorosilane and silicon tetrachloride is recovered in the form of a condensed liquid phase consisting essentially of $SiCl_4$, this liquid phase then being removed from the $SiCl_4$ circuit and expanded to a pressure of 1 bar outside said $SiCl_4$ circuit and cooled to a temperature of 10 to 40° C., whereby dissolved impurities separate out and are then removed by filtration.

11 Claims, 1 Drawing Sheet

METHOD FOR PRODUCING SILANE

Figure 1:
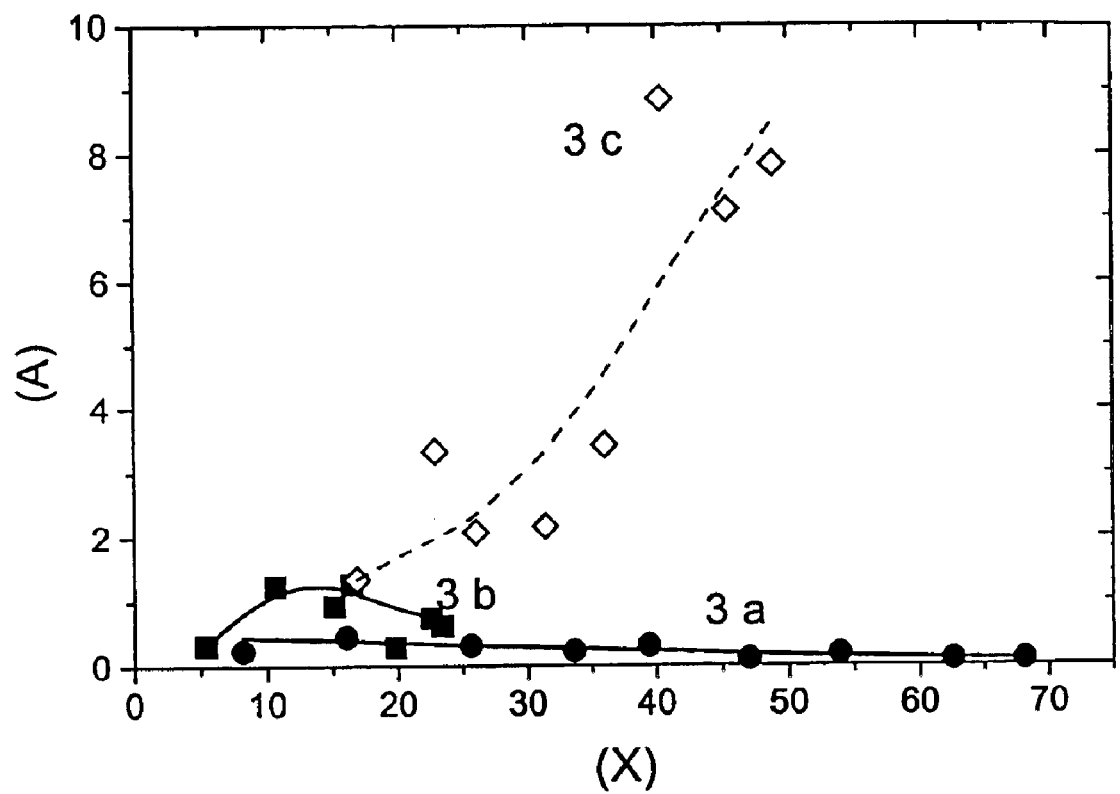

The present invention relates to a method for producing silane ($SiH_4$) by reacting metallurgical silicon with silicon tetrachloride ($SiCl_4$), hydrogen ($H_2$) and hydrogen (HCl), removing impurities from the resulting crude gas stream containing trichlorosilane ($SiHCl_3$) and disproportionating the said $SiHCl_3$ to form $SiCl_4$ and silane.

Silane can be used for the manufacture of high-purity silicon as required for the manufacture of semi-conductors and solar cells. According to "Silicon for the Chemical Industry IV, Geiranger, Norway, Jun. 3–5, 1998, Ed.: H. A. Øye, H. M. Rong, L Nygaard, G. Schüissler, J. Kr. Tuset, p. 93–112" silane required for the manufacture of high-purity silicon is produced by two different methods:

Reacting silicon tetrafluoride ($SiF_4$) with sodium aluminium hydride ($NaAlH_4$) to form $SiH_4$ and sodium aluminium fluoride ($NaAlF_4$), purifying the produced $SiH_4$, separation of high-purity silicon on silicon seed crystal in a fluidized bed and removal of $H_2$ from the formed high-purity silicon granules. Large amounts of $NaAl_4$ occur in this process which must be utilized or marketed accordingly.

Reaction of metallurgical silicon with $SiCl_4$ and $H_2$ in a fluidized bed to form $SiHCl_3$, catalysed two-stage disproportionation of said $SiHCl_3$ to form $SiCl_4$ and $SiH_4$, returning the $SiCl_4$ formed by disproportionation to the reaction of metallurgical silicon with $SiCl_4$ and $H_2$, thermal decomposition of the formed $SiH_4$ on silicon rods to form high-purity silicon and returning the $H_2$ formed by decomposition to the reaction of metallurgical silicon with $SiCl_4$ and $H_2$.

The latter method is characterized in that the inevitable production of large amounts of by-products is avoided because the $SiCl_4$ occurring in the process is used for the manufacture of $SiHCl_3$ by reacting said $SiCl_4$ with metallurgical silicon and hydrogen.

Embodiments of said method are specified in "Studies in Organic Chemistry 49, Catalyzed Direct Reactions of Silicon, Elsevier, 1993, p. 450 to 457", DE 3 311 650 C2 und CA-A-1 162 028. According to the above documentation, the manufacture of silane according to the said method comprises the following steps:

1. Reacting of metallurgical silicon with $SiCl_4$ and $H_2$ at temperatures from 400 to 600° C. and a pressure from 20.7 to 41.4 bar in a fluidized-bed reactor.
2. Removing impurities, such as not reacted fine silicon, metal chlorides, polysilane, siloxane and, if necessary, catalyst, from the resulting reaction mixture containing chlorosilane and hydrogenous acid by washing the hot crude gas stream with condensed chlorosilanes.
3. Removing the resulting chlorosilane suspension containing solids.
4. Condensing the purified reaction mixture.
5. Returning the hydrogen formed in Step 4 in Step 1.
6. Separating the purified reaction mixture by distillation to form $SiCl_4$ and $SiHCl_3$.
7. Returning the $SiCl_4$ in Step 1.
8. Two-stage catalysed disproportionation of the $SiHCl_3$ obtained in Step 6 to form $SiH_4$ and $SiCl_4$.
9. Returning the $SiCl_4$ in Step 1.
10. Removing impurities by distillation from the $SiH_4$ obtained in Step 8.

A disadvantage of the specified method is that the removal of impurities from the hot gas stream resulting from the reaction in the fluidized bed by washing with condensed chlorosilanes (Step 2) is technically very expensive due to the presence of fine solid gas components. There is further the risk that the employed apparatus may be choked by solids which makes a continuous operation difficult.

The chlorosilane suspension resulting from Step 2 containing silicon metal and metal chloride is removed in accordance with DE 3 709 577 A1 by a specific separation of chlorosilanes and solids by distillation whereby a high percentage of chlorosilanes can be recovered and is returned to the circuit. The remaining distillation bottom product containing solids and chlorosilane cannot be utilized and must be disposed of in a way as it is specified, for example, in U.S. Pat. No. 4,690,810. This procedure impairs the economic efficiency of the method. Another disadvantage is that together with the recovered chlorosilane undesired impurities are returned to the process operating state silane production which can result in an undesired concentration of such impurities affecting the process.

So characteristic for the method is a returning stream of silicon tetrachloride. Combining all relevant equations, silane is produced from silicon and hydrogen by this method. Silicon tetrachloride is permanently circulating during the reaction and does not leave the said circuit.

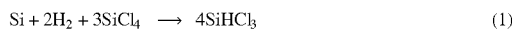

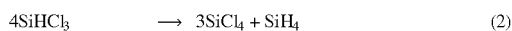

Because of the incomplete reaction of silicon, hydrogen and silicon tetrachloride the first equation should be defined more exact as follows:

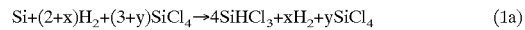

This does not change the total result of equation (3), but it becomes visible that the not reacted silicon tetrachloride increases the circuit stream of silicon tetrachloride.

The object of the present invention was to provide a method for the manufacture of silane that is free of the above specified disadvantages and allows to produce silane at low costs.

The present invention relates to a method for producing silane ($SiH_4$) by a) reacting metallurgical silicon with silicon tetrachloride ($SiCl_4$) and hydrogen ($H_2$) to form a crude gas stream containing trichlorosilane ($SiHCl_3$) and silicon tetrachloride ($SiCl_4$), b) removing impurities from the resulting crude gas stream by washing with condensed chlorosilanes to produce a purified crude gas stream containing trichlorosilane and silicon tetrachloride and a homogeneous liquid phase consisting essentially of $SiCl_4$, this liquid phase then being removed from the circuit, c) condensing and subsequently separating the purified crude gas stream by distillation to form a partial stream consisting essentially of $SiCl_4$ and a partial stream consisting essentially of $SiHCl_3$, d) returning the partial stream consisting essentially of $SiCl_4$ to the reaction of metallurgical silicon with $SiCl_4$ and $H_2$, e) disproportionating the partial stream containing trichlorosilane to form $SiCl_4$ and $SiH_4$, and f) returning the $SiCl_4$ formed by disproportionation to the reaction of metallurgical silicon with $SiCl_4$ and $H_2$, characterized in that the crude gas stream containing trichlorosilane and silicon tetrachloride being liberated from solids as far as possible by gas filtration before being washed with the condensed chlorosilanes, the washing process with the condensed chlorosilanes is carried out at a pressure of 25 to 40 bar and at a temperature of at least 150° C. in a multi-stage distillation column and is carried out in such a way that 0.1 to 3 weight percent of the crude gas stream containing trichlorosilane and silicon tetrachloride is recovered in the form of a condensed liquid phase consisting essentially of $SiCl_4$, condensed liquid phase consisting essentially of $SiCl_4$ then being removed from the $SiCl_4$ circuit and expanded to a pressure of 1 bar outside said $SiCl_4$ circuit and cooled to a temperature of 10 to 40° C., whereby dissolved impurities separate out and are then removed by filtration.

Preferably washing is carried out in such a way that 0.5 to 1.5 weight percent of the crude gas stream containing trichlorosilane and silicon tetrachloride is recovered as in the form of a condensed liquid phase consisting essentially of $SiCl_4$.

Metallurgical silicon in this meaning refers to silicon containing up to approx. 3 weight percent iron, 0.75 weight percent aluminium, 0.5 weight percent calcium and other impurities as can usually be found in silicon obtained by carbothermal reduction of silicon-di-oxide.

Preferably the reaction of metallurgical silicon with $SiCl_4$ and $H_2$ (Step a)) is carried out at temperatures from 500 to 800° C. and a pressure from 25 to 40 bar.

Suitable apparatuses for gas filtration are, for example, cyclones or hot-gas filters. In an advantageous embodiment of the method according to the invention gas filtration is carried out in several cyclones which are connected in series or in multi-cyclones. Such filter apparatuses are specified for example in Ullmann's Encyclopedia of Industrial Chemistry, Volume B 2, Unit Operation 1, $5^{th}$ complete revised Edition, VCH-Verlagsgesellschaft, Weinheim p. 13-4 to 13-8. Alternatively also hot-gas filters with sintered metal or ceramic candles or combinations of cyclones and hot-gas filters can be used. Using the above mentioned filter apparatuses ensures that the solids are separated from the crude gas stream as far as possible enabling an unobstructed subsequent washing with the condensed chlorosilanes. In the method according to the invention impurities that are still contained in the crude gas stream after gas filtration, such as metal chlorides, non-metal chlorides, siloxanes and polysilanes, are separated in the condensed liquid phase consisting essentially of $SiCl_4$ and can easily be removed together with it from the process of silane production.

Another advantage is that by this method a solid containing silicon metal is obtained which can be used in metallurgical processes, such as e.g. the manufacture of iron alloys, due to its high silicon contents. To this end the solid containing silicon metal and metal chloride can be reacted for example with alkaline compounds, such as soda lye, $Na_2CO_3$, $NaHCO_3$ and CaO and water, filtered and washed with water to remove chloride and dried if necessary.

Preferably the liquid phase consisting essentially of $SiCl_4$ resulting from washing with condensed chlorosilanes and the subsequent pressure reduction and cooling is liberated from impurities separated out by means of plate pressure filters. It is preferred to use sintered metals, particularly preferred sintered wire-cloth, as filter elements. Such filter elements are commercially available under the trade names Poroplate® and Fuji-Plate®. Alternatively decanters can also be used to remove the impurities separating out.

The resulting filtrate is excellently suitable as raw material for the manufacture of pyrogenic silicic acid and is therefore preferably used for this purpose. Any further reprocessing, e.g. by distillation, is not required. The solid resulting from filtration can be inerted in the known way with alkaline compounds, such as soda lye, $Na_2CO_3$, $NaHCO_3$ and CaO and used after inerting as raw material in the manufacture of cement.

In a particularly preferred embodiment of the method according to the invention the need of chloride equivalents caused by the discharge of filtrate essentially consisting of $SiCl_4$ is compensated by adding 0.05 to 10 weight percent hydrogen chloride (HCl), based on the amount of $SiCl_4$ introduced, as an additional reactand in reacting metallurgical silicon with $SiCl_4$ and $H_2$. Preferably an amount of 0.5 to 3 weight percent HCl is used.

Using an amount of 0.5 to 10 weight percent HCl, based on the amount of $SiCl_4$ introduced, as additional reactand causes an unexpected acceleration of the reaction finally resulting in a very high yield of $SiHCl_3$, that means high reaction rates near the thermodynamic equilibrium of the $SiCl_4$ employed, and at the same time high total yields, i.e. a largely complete utilization of the metallurgical silicon employed.

Hydrogen chloride is preferably used in an anhydrous form as hydrogen chloride gas.

Hydrogen chloride, for example, cannot be introduced separately in the reactor where the reaction to form trichlorosilane will be carried out. It is also possible, however, to introduce hydrogen chloride in the reactor together with gaseous and/or vaporisable starting materials hydrogen and/or silicon tetrachloride.

The preferred embodiment of the method according to the invention comprising the addition of hydrogen chloride when reacting metallurgical silicon with $SiCl_4$ and $H_2$ is characterized mainly in that an acceleration of the reaction is caused by using the inventive amounts of HCl as additional reactand thus achieving a higher utilization ratio of the metallurgical silicon used and improving the economic efficiency of the method considerably.

So the addition of the preferably to be added amount of hydrogen chloride causes a faster activation of silicon. When fresh silicon is reacted with hydrogen and silicon tetrachloride or such reaction is continued after an interruption of the process, an induction period occurs lasting approx. 100 minutes, for example, in case of a reaction temperature of 600° C. and a $H_2$: $SiCl_4$ mol ratio of 2:1. Such induction period is reduced to 45 minutes by addition of 2 weight percent hydrogen chloride based on silicon tetrachloride and apart from this the same conditions. Since in a reaction carried out in a continuously operated fluidized-bed reactor a considerable part of the fluidized bed always contains freshly introduced silicon the faster activation of such silicon has an accelerating effect on the process as a whole.

Furthermore, adding hydrogen chloride causes the reaction gasses to attack all over the complete silicon area. When adding solid catalysts to the silicon to be reacted the reaction with the hydrogen/silicon tetrachloride gas occurs immediately at the edge of the catalyst corns resulting in crater-like cavities. Upon further progress of the reaction into the depth, the silicon surfaces that were previously covered with catalyst particles are undermined and the particles disengage from the silicon corn and are subsequently carried away as small particles from the fluidized bed. Thus neither the said silicon particles which were carried away, nor the adherent catalysts are available for the desired reaction. The consequences are a worse total yield and a decreasing reaction velocity of the silicon particle depleted of catalyst. The same occurs, in principle, in the uncatalysed reaction of silicon with hydrogen/silicon tetrachloride without addition of hydrogen chloride. In this case the reaction proceeds in crater-like cavities along the band formed by the impurities separating out. Such band contain the impurities contained in silicon or introduced by the raw materials and the production process, essentially iron, aluminium, calcium, titanium, causing also an acceleration of the reaction. In contrast, the reaction of silicon with hydrogen/silicon tetrachloride in the presence of hydrogen chloride occurs all over the surface of the silicon corns forming a high number of crater-like cavities on the surface of such silicon corns. Since the complete surface of the silicon corns provides essentially more reaction area than the sections occupied by catalyst particles and/or the bands on the edges of the corns containing the collected impurities, the silicon area participating in the reaction is much bigger thus causing an acceleration of the reaction velocity depending on the area.

The preferred embodiment of the method according to the invention comprising the addition of hydrogen chloride when reacting metallurgical silicon with $SiCl_4$ and $H_2$ is also characterized in that the amount of silicon carried out undesiredly is reduced. Reacting on large surfaces of the silicon corns in the presence of hydrogen chloride prevents the undermining of the spots containing catalyst and the corn-bursting trenching reaction along the bands containing impurities preventing the blasting off of small silicon particles and their being carried out of the fluidized bed by the reaction gasses. This increases the yield of trichlorosilane based on the amount of silicon tetrachloride used as well as based on the silicon used.

In addition to this, adding hydrogen chloride results in a constant reaction velocity in the course of the decomposition of silicon. Contrary to the catalysed reaction without addition of hydrogen chloride the reaction velocity of the silicon/hydrogen/silicon tetrachloride reaction is not reduced considerably in the presence of hydrogen chloride. This finding is surprising, since the silicon corns are getting smaller in the course of the reaction which should cause a reduction of surface of a given amount of silicon, and the surface-related residence time of the reaction gasses decreases as well.

The selection of the reactor for the reaction according to the invention is not critical, provided that under the reaction conditions the reactor shows adequate stability and permits the contact of the starting materials. The process can be carried out, for example, in a fixed bed reactor, a rotary tubular kiln or a fluidized-bed reactor. It is preferred to carry out the reaction in a fluidized-bed reactor.

The material of the reactor must resist the reaction conditions mentioned for $SiHCl_3$ synthesis. The requirements on the resistance of the construction materials of the reactor apply also for any preceding and secondary parts of the plant, such as for example cyclones or heat exchangers. These requirements are fulfilled, for example, by nickel base alloys.

Further acceleration of the reaction of metallurgical silicon with $SiCl_4$, $H_2$ and HCl, if applicable, can be achieved by the use of catalysts. Particularly suitable catalysts are copper, iron, copper or iron compounds or any mixtures thereof.

Surprisingly it was found that the catalysts unfold particularly high efficiency when the metallurgical silicon is provided in a milled form and was mixed intensively with the catalysts prior to the reaction.

It is therefore preferred in the method according to the invention to carry out the reaction to form trichlorosilane (Step a)) in the presence of catalyst, and to mix the metallurgical silicon intensively with the catalysts prior to the reaction.

Preferably the silicon is provided in fine form, particularly preferred with an average grain diameter of 10 to 1000 $\mu$m, more particularly preferred of 100 to 600 $\mu$m. The average grain diameter is calculated as the arithmetical mean of the values determined in a sieve analysis of the silicon.

Preferably, the mixing of catalyst and silicon is carried out in apparatuses ensuring a very intensive mixing. Particularly suitable for this purpose are mixers provided with rotary mixing tools. Such mixers are specified for example in "Ullmann's Encyclopedia of Industrial Chemistry, Volume B2, Unit Operations I, p.27-1 to 27-16, VCH Verlagsgesellschaft, Weinheim". Particularly preferred is the use of plough blade mixers.

During intensive mixing the catalyst can be milled further which results in a very good distribution of the catalyst during mixing and a very good adherence of the catalyst on the silicon surface. Therefore also catalysts can be used which are not available in a very fine form or cannot be milled to the required fineness.

In the case of insufficient mixing a large portion of catalyst is directly carried out of the fluidized bed together with the gaseous reactands and/or products due to poor adherence of catalyst to silicon particles and is therefore not available for the reaction any more. This causes an increased demand for catalyst impairing the economic efficiency of the method. This is avoided by intensive mixing of silicon and catalyst.

Preferably the time for mixing silicon and catalyst is 1 to 60 minutes. As a rule, longer mixing times are not required. Particularly preferred are mixing times from 5 to 20 minutes.

Intensive mixing of catalyst and silicon can be carried out for example in an inert atmosphere or in the presence of hydrogen or other gasses with a time-reducing effect, e.g. carbon monoxide. This prevents formation of an oxidic layer on the individual silicon particles. Such layer prevents direct contact between catalyst and silicon which would result in a poorer catalysing of the reaction with silicon tetrachloride, hydrogen and, if necessary, hydrogen chloride to trichlorosilane.

An inert atmosphere can be achieved, for example, by adding an inert gas during mixing. Suitable inert gasses are, for example, nitrogen and/or argon.

Particularly preferred is the mixing of silicon and catalyst in the presence of hydrogen.

On principle, all catalysts known for reacting silicon with silicon tetrachloride, hydrogen and, if necessary, hydrogen can be used as catalyst.

Particularly suitable catalysts are copper and iron catalysts. Examples for this are copper oxide catalysts (e.g. Cuprokat®, manufacturer: Norddeutsche Affinerie), copper chloride (CuCl $CuCl_2$), copper metal, iron oxides (e.g. $Fe_2O_3$, $Fe_3O_4$), ferrous chlorides ($FeCl_2$, $FeCl_3$) and their mixtures.

Preferred catalysts are copper oxide catalysts and iron oxide catalysts.

Particularly when using copper oxide catalysts and iron oxide catalysts it has proved advantageous to mix the silicon at a temperature from 100 to 400° C., preferably from 130 to 250° C. This removes any moisture residue adherent to catalysts which would otherwise have a negative impact on the reaction of silicon with $SiCl_4$, $H_2$ and HCl, if applicable. Mixing in the presence of reducing gasses, preferably hydrogen, furthermore reduces oxidic components of the catalysts preventing a yield reduction caused by oxygen or oxides when reacting metallurgical silicon with $SiCl_4$ and $H_2$. Furthermore a better adherence of catalyst to the silicon surface is achieved by this method avoiding largely any catalyst loss in the fluidized bed.

It is also possible to use mixtures of copper catalysts and/or iron catalysts with further catalytically active components. Such catalytically active components are, for example, metal halogenides, such as e.g. chlorides, bromides or iodides of aluminium, vanadium or antimony.

Preferably the amount of catalyst used, calculated as metal, is 0.5 to 10 weight percent, particularly preferred 1 to 5 weight percent, based on the silicon employed.

The mol ratio of hydrogen to silicon tetrachloride when reacting metallurgical silicon with $SiCl_4$ und $H_2$ can be for example 0.25:1 to 4:1. A mol ratio of 0.6:1 to 2:1 is preferred.

The partial stream resulting from the separation of the purified crude gas stream containing trichlorosilane and silicon tetrachloride by distillation consisting essentially of $SiHCl_3$ is disproportionated preferably in a column at a pressure from 1 to 10 bar, wherein the column provides at least two reactive/destillative reaction zones.

Such disproportionation is carried out on catalytically active solids, preferably in catalyst beds each one consisting of a layer of bulk material of said catalytically active solids which can be streamed through by the products of the disproportionation. Instead of a layer of bulk material also packed catalyst bodies can be provided in the reaction zone.

Suitable catalytically active solids are known and specified, for example, in DE 2 507 864 A1. Such suitable solids, for example, are solids carrying amino groups or alkyleneamino groups on a structure of polystyrene, crosslinked with divinylbenzole. Suitable amino groups or alkylenamino groups are for example: dimethylamino, diethylamino, ethylmethylamino, di-n-propylamino, di-isopropylamino, di-2-chlorethylamino, di-2chlorpropylamino groups and the respective hydrochlorides, or the trialkylammonium groups formed from them by methylation, ethylation, propylation, butylation, hydroxyethylation or benzylation with chloride as counterion. Of course, in the case of quaternary ammonia salts or protonized ammonia salts also catalytically active solids with other anions, e.g. hydroxide, sulphate, bisulphate, bicarbonate etc. can be introduced into the method according to the invention, a transformation into the chloride form, however, is inevitable under the reaction conditions in the course of time, this applies also to organic hydroxy groups. Therefore, ammonia salts containing chloride as counterion are preferred.

Also those solids are suitable as catalytically active solids which consist of a structure of polyacrylic acid, particularly a polyacrylamide structure, that has bound, for example, trialkylbenzylammonium via an alkyl group.

Another suitable group of catalytically active solids are, for example, solids carrying sulphonate groups on a structure of polystyrene, cross-linked with divinylbenzole, which are opposed by tertiary or quaternary ammonium groups as cations.

As a rule, macroporous or mesoporous ion exchangers are more suitable than gel resins.

Preferably the method according to the invention is integrated into a general method for producing hyper-pure silicon.

Particularly preferred, the method according to the invention is integrated into a multistage general method for producing hyper-pure silicon, as specified for example in "Economics of Polysilicon Process, Osaka Titanium Co., DOE/JPL 1012122 (1985), 57–78" and comprising the following steps:

a) Production of trichlorosilane;

b) Disproportionation of trichlorosilane to yield silane;

c) Purifying silane to obtain high-purity silane, and d) Thermal decomposition of silane in a fluidized-bed reactor and depositing of hyper-pure silicon on the silicon particles which form the fluidized bed.

The particular advantages of adding hydrogen chloride when reacting metallurgical silicon with $SiCl_4$ and $H_2$, as it is carried out in Step a) of a preferred embodiment of the method according to the invention, is being explained in more detail in the following examples. The examples shall not be understood, however, as a restriction to the inventive idea insofar.

EXAMPLE 1a 400 g silicon (99.3 weight percent silicon, average diameter of particles Dp=250–315 μm) were provided in a fluidized-bed reactor with an internal diameter (I.D.) of 0.05 m and were reacted with hydrogen and silicon tetrachloride at a temperature T=600° C. and a total pressure of $P_{tot}$=1.1 bar. The mol ratio $H_2/SiCl_4$ was 2 in the presence of 20 volume percent $N_2$. The reaction was carried out under addition of 2 weight percent HCl, based on the amount of silicon tetrachloride. The time for achieving 95% of stationary yield of trichlorosilane was $T_{95\%}$=45 min.

EXAMPLE 1b (COMPARATIVE EXAMPLE)

The reaction according to Example 1a was repeated, however, without adding HCl. The time for achieving 95% of stationary yield of trichlorosilane was $T_{95\%}$=100 min.

EXAMPLE 2a 400 g silicon (99.3 weight percent silicon, average diameter of particles Dp=250–315 μm) were provided in a fluidized-bed reactor with an internal diameter (I.D.) of 0.05 m and were reacted with hydrogen and silicon tetrachloride at a temperature T=600° C. and a total pressure of $P_{tot}$=1.1 bar. The mol ratio $H_2/SiCl_4$ was 2 in the presence of 20 volume percent $N_2$. The reaction was carried out several days. An amount of 1.5±1–0.5 weight percent based on the amount of silicon tetrachloride was added continuously. After 24.2% of silicon were reacted the reaction mass was examined by means of surface electron microscopy. It shows that a reaction of silicon had occurred all over the surface of the silicon particles.

EXAMPLE 2b (COMPARATIVE EXAMPLE)

The reaction according to Example 2a was repeated, this time, however, without adding hydrogen chloride. After 23.4% of silicon were reacted the reaction mass was examined by means of surface electron microscopy. It can be recognized that the silicon reacted only on single points and edges.

EXAMPLE 2c (COMPARATIVE EXAMPLE)

Similar to Example 2a, 400 g of silicon (99.3 weight percent silicon, average diameter of particles Dp=160–195 μm) were provided in a fluidized-bed reactor with an internal diameter (I.D.) of 0.05 m and were reacted with hydrogen and silicon tetrachloride at a temperature T=600° C. and a total pressure of $P_{tot}$=1.1 bar. The mol ratio $H_2/SiCl_4$ was 2 in the presence of 20 volume percent $N_2$. The reaction was carried out several days. But no HCl was added, the reaction was carried out instead in the presence of 1 weight percent Cu in form of Cu metal/$Cu_2O$/CuO as catalyst. After 31.4% of silicon were reacted the reaction mass was examined by means of surface electron microscopy. It shows that a slight reaction of silicon occurred, but also undermining of the surface and formation of big cavities can be observed.

EXAMPLE 3a

Example 2 a was repeated, but this time the reaction was not interrupted after 24.2% of silicon had reacted. The amount of material carried away was determined by means of the amounts separated in a cyclone. The amount of material carried away decreased continuously according to the degree of reacted silicon and was below 0.5 weight percent based on the amount of reacted silicon already when a degree of 15% of reacted silicon was reached.

EXAMPLE 3b (COMPARATIVE EXPERIMENT)

Example 2 b was repeated, but this time the reaction was not interrupted after 23.4% of silicon had reacted. The amount of material carried away was determined by means of the amounts separated in a cyclone. The amount of material carried away increased up to a degree of reacted silicon of approx. 15% and then decreased. At a degree of reacted silicon of approx. 15% the amount of material carried away was above 1.0 weight percent based on the amount of reacted silicon.

EXAMPLE 3c (COMPARATIVE EXPERIMENT)

Example 2 c was repeated, but this time the reaction was not interrupted after 31.4% of silicon had reacted. The amount of material carried away was determined by means of the amounts separated in a cyclone. The amount of material carried away increased continuously according to the degree of reacted silicon and was above 1.0 weight percent based on the amount of reacted silicon already when a degree of 15% of reacted silicon was reached. At a degree of reacted silicon of approx. 45% amounts of material carried away of above 7.0 weight percent based on the amount of reacted silicon were observed.

A comparison of the amount carried away in a reaction according to Examples 3a, 3b and 3c is depicted in FIG. 1 specifying the amount carried away (A) based on the amount of reacted silicon in weight percent in comparison with the degree of reacted silicon (X) in %. The designations 3a, 3b, 3c of the graphs correspond to the numbering of the examples.

EXAMPLE 4

400 g silicon (99.3 weight percent silicon, average diameter of particles (Dp) in uncatalysed reaction and under addition of HCl: Dp=250–315 μm; Cu-catalysed reaction: Dp=160–195 μm) were provided in a fluidized-bed reactor with an internal diameter (I.D.) of 0.05 m and the hydrogen-chloride reaction was carried out at a temperature T=600° C. and a total pressure of $P_{tot}$=1.1 bar for several days. The mol ratio $H_2/SiCl_4$ was 2 in the presence of 20 volume percent $N_2$. Three forms of reaction were carried out: a) not catalysed without adding HCl (comparison), b) Cu-catalysed without adding HCl (1% Cu as Cu metal/$Cu_2O$/CuO) (comparison) and c) without Cu catalyst and with additional adding of 1.5±0.5 weight percent of HCl. In the different forms of the reaction the yield of the target product trichlorosilane was determined. It shows that the yield in a reaction according to the invention including the addition of HCl is not decreasing as considerably during the reaction as in the case of the uncatalysed or Cu catalysed reactions without addition of HCl.

what is claimed is:

1. Method for producing silane ($SiH_4$) by
a) reacting metallurgical silicon with silicon tetrachloride ($SiCl_4$) and hydrogen ($H_2$) to form a crude gas stream containing trichlorosilane ($SiHCl_3$) and silicon tetrachloride ($SiCl_4$),
b) removing impurities from the resulting crude gas stream by washing with condensed chlorosilanes to produce a purified crude gas stream containing trichlorosilane and silicon tetrachloride and a homogeneous liquid phase consisting essentially of $SiCl_4$, this liquid phase then being removed from the circuit,
c) condensing and subsequently separating the purified crude gas stream by distillation to form a partial stream consisting essentially of $SiCl_4$ and a partial stream consisting essentially of $SiHCl_3$,
d) returning the partial stream consisting essentially of $SiCl_4$ to the reaction of metallurgical silicon with $SiCl_4$ and $H_2$,
e) disproportionating the partial stream containing $SiHCl_3$ to form $SiCl_4$ and $SiH_4$, and
f) returning the $SiCl_4$ formed in the reaction to the reaction of metallurgical silicon with $SiCl_4$ and $H_2$, characterized in that the crude gas stream containing trichlorosilane and silicon tetrachloride is liberated from solids as far as possible by gas filtration before being washed with the condensed chlorosilanes,
the washing process with the condensed chlorosilanes is carried out at a pressure of 25 to 40 bar and at a temperature of at least 150° C. in a multi-stage distillation column and is carried out in such a way that 0.1 to 3 weight percent of the crude gas stream containing trichlorosilane and silicon tetrachloride is recovered in the form of a condensed liquid phase consisting essentially of $SiCl_4$,
such condensed liquid phase consisting essentially of $SiCl_4$ is removed from the $SiCl_4$ circuit and expanded to a pressure of 1 bar outside said $SiCl_4$ circuit and cooled to a temperature of 10 to 40° C., whereby dissolved impurities separate out, and such impurities separating out are removed by filtration.

2. A method according to claim 1, characterized in that the gas filtration is carried out in several cyclones which are connected in series.

3. A method according to claim 1, characterized in that the impurities separating out are removed from the liquid phase consisting essentially of $SiCl_4$ by filtration by means of plate pressure filters provided with sintered wire-cloth as filter element.

4. A method according to claim 3, characterized in that the filtrate consisting essentially of $SiCl_4$ is used as raw material for the manufacture of pyrogenic silicic acid.

5. A method according to claim 1, characterized in that 0.05 to 10 weight percent hydrogen chloride (HCl), based on the amount of $SiCl_4$, is used as an additional reactant in reacting metallurgical silicon with $SiCl_4$ and $H_2$.

6. A method according to claim 1, characterized in that 0.5 to 3 weight percent HCl, based on the amount of $SiCl_4$ introduced, is used as an additional reactant in reacting metallurgical silicon with $SiCl_4$ and $H_2$.

7. A method according to claim 1, characterized in that the hydrogen chloride to be added is used in an anhydrous form as hydrogen chloride gas.

8. A method according to claim 1, characterized in that the reaction of metallurgical silicon with $SiCl_4$ and $H_2$ is carried out in the presence of a catalyst.

9. A method according to claim 8, characterized in that the catalysts used are at least one of copper, iron, copper compounds, iron compounds or any mixtures thereof.

10. A method according to claim 1, characterized in that the reaction of metallurgical silicon with $SiCl_4$ and $H_2$ is carried out at temperatures from 500 to 800° C. and a pressure from 25 to 40 bar.

11. A method according to claim 1, characterized in that the gas filtration is carried out in several cyclones which are connected in one multi-cyclone.

* * * * *